US012532958B2

(12) United States Patent
Jones-Kanu

(10) Patent No.: US 12,532,958 B2
(45) Date of Patent: Jan. 27, 2026

(54) POCKETED REUSABLE BAG HOLDER

(71) Applicant: Liza Jones-Kanu, Croton On Hudson, NY (US)

(72) Inventor: Liza Jones-Kanu, Croton On Hudson, NY (US)

(*) Notice: Subject to any disclaimer, the term of this patent is extended or adjusted under 35 U.S.C. 154(b) by 1083 days.

(21) Appl. No.: 17/548,164

(22) Filed: Dec. 10, 2021

(65) Prior Publication Data

US 2022/0183451 A1 Jun. 16, 2022

Related U.S. Application Data

(60) Provisional application No. 63/123,621, filed on Dec. 10, 2020.

(51) Int. Cl.
*A45F 5/10* (2006.01)
*A45F 3/14* (2006.01)

(52) U.S. Cl.
CPC .............. *A45F 5/1026* (2013.01); *A45F 3/14* (2013.01); *A45F 2003/142* (2013.01); *A45F 2003/144* (2013.01); *A45F 2005/1006* (2013.01); *A45F 2005/1086* (2013.01)

(58) Field of Classification Search
CPC .... A45F 5/1026; A45F 3/14; A45F 2003/142; A45F 2003/144; A45F 2005/1006; A45F 2005/1086; A45C 11/26
See application file for complete search history.

(56) References Cited

U.S. PATENT DOCUMENTS

| | | | |
|---|---|---|---|
| 5,361,956 A * | 11/1994 | Recanati ................... | A45F 5/00 294/169 |
| 5,823,594 A * | 10/1998 | Hayes ....................... | A45F 5/00 294/142 |
| 6,550,653 B2 * | 4/2003 | Matthews ................. | A45F 3/14 224/264 |
| 6,923,356 B2 * | 8/2005 | Reynolds ................ | B60R 7/043 224/604 |
| 8,474,412 B1 * | 7/2013 | Walden ................ | A01K 1/0263 119/725 |
| 11,713,001 B2 * | 8/2023 | Morgan .................... | B60R 7/08 296/37.8 |

* cited by examiner

*Primary Examiner* — Stephen A Vu
(74) *Attorney, Agent, or Firm* — Michael L. Greenberg, Esq.; Greenberg & Lieberman, LLC

(57) ABSTRACT

A pocketed reusable bag holder, organizer, and storage apparatus and system of use thereof, configured to facilitate the easy transport, storage, and use of reusable bags conventionally employed for grocery shopping. The holder exhibits a body having a generally planar shape which is configured to roll up while containing multiple reusable bags when not in use. When needed, the body is unrolled, revealing the reusable bags which are stored in an organized fashion on a hook. The body is mountable to a handle of a shopping cart via multiple hook-and-loop fasteners. Pockets are present on a front and a rear of the unrolled body, which facilitate storage of personal items during the shopping experience, such as a mobile device, shopping list, and coupons. A stabilizing bar prevents undesired torsion of the body during use.

8 Claims, 14 Drawing Sheets

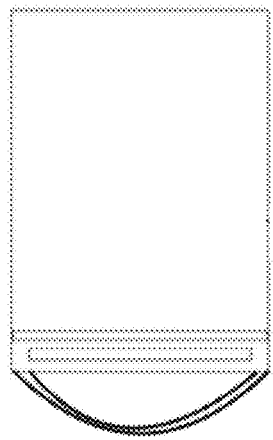
OPEN BACK
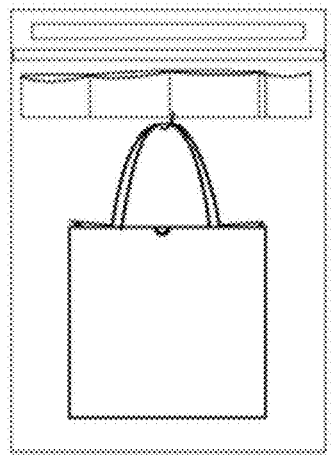
OPEN FRONT
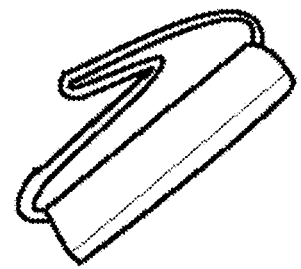
ROLLED UP
FIGURE 13

POCKETED REUSABLE BAG HOLDER

This application is a non-provisional application of provisional patent application No. 63/123,621, filed on Dec. 10, 2020, and priority is claimed thereto.

FIELD OF THE PRESENT INVENTION

The present invention relates to the field of personal logistics, and more specifically relates to a pocketed reusable bag holder apparatus and system of use thereof configured to facilitate the storage, transport, access, and use of reusable grocery bags in a more expedient, comfortable, and useful manner.

BACKGROUND OF THE PRESENT INVENTION

Presently, shoppers are required at many stores to bring their own recyclable bags to the supermarket. For people who have larger families and buy a lot of groceries, shoppers are often faced with having to scramble to gather their bags together, keep them organized, remember to bring them, and find a place to put them once they get into the store.

Recently, bags that sit within the primary receptacle of shopping carts have been made to address these issues, but current products often have many insufficiencies and limitations, some of which include: inefficient and inadequate use of cart space, ill-fitting rods that are too long and poke out of the sides of the cart, hitting people, or are too short to extend to the sides of the cart, rendering the designs useless. Other problems include bags being so large that they drag on the floor when used by shorter individuals, bags which cannot accommodate a decent amount of groceries without becoming too heavy to carry, and bags that pool at the bottom of carts, clumsily allowing fragile items to smash together and break.

Another huge drawback concerns the amount of time wasted as the user has to unload their groceries completely before they can move their cart to the other side to repack the bags. Many bags associated with these types of products also have flimsy bottoms that do not allow the bags to stand upright independently without collapsing; meaning the shopper must wait until all bags are completely empty before they can move the cart down to the packing area to repack the bags, thereby wasting time unnecessarily. In short, current products do not provide shoppers with a simple, problem-free approach to carrying reusable bags and providing them with easy access to shopping essentials such as lists, gloves, scanners, sanitizer and more. If there were a more convenient, nuisance-free method for accessing and storing recyclable bags during and after shopping, shoppers would benefit from a better shopping experience.

Thus, there is a need for a pocketed reusable bag holder, and method of use thereof, which functions to address the aforementioned problems, quickly storing and organizing the reusable bags for use in an unobtrusive and easy manner. Such an apparatus addresses these needs without inefficiently using cart space, ill-fitting rods, large cumbersome bags that collapse and pool at the bottom of the carts, drag on the ground, and pool at the bottom of carts offering products no stability. With this product the shopper won't need to waste time, needlessly.

SUMMARY OF THE PRESENT INVENTION

The present invention is a reusable bag holder equipped with pockets. The present invention is configured to enable a user to neatly and easily organize, store, transport, and ultimately use their reusable bags conveniently. The present invention is fashioned of a fabric and/or synthetic material which is configured to roll up for easy storage and transport when not in use, similar to a conventional tool roll. Reusable bags are stored within the roll until needed in an upright and organized fashion. Once at the store, the user obtains a shopping cart and unrolls the present invention, revealing the reusable bags. The apparatus is configured to be affixed to the handle of the shopping cart by the user via a loop which circumscribes the horizontal handle of the shopping cart. The loop is secured in position via a horizontal strip of Velcro™ or similar hook-and-loop fastener. Once secured, the remainder of the unrolled apparatus dangles down towards the floor, and unused bags remain secured on a pivoting hook. Pockets are present above the bags to conveniently retain personal items of the user, such as a shopping list, mobile device, or item scanner as provided by the supermarket.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 13 shows another embodiment of the present invention with an open front, open back and rolled-up views.

DETAILED DESCRIPTION OF THE PREFERRED EMBODIMENT

Figure 1:
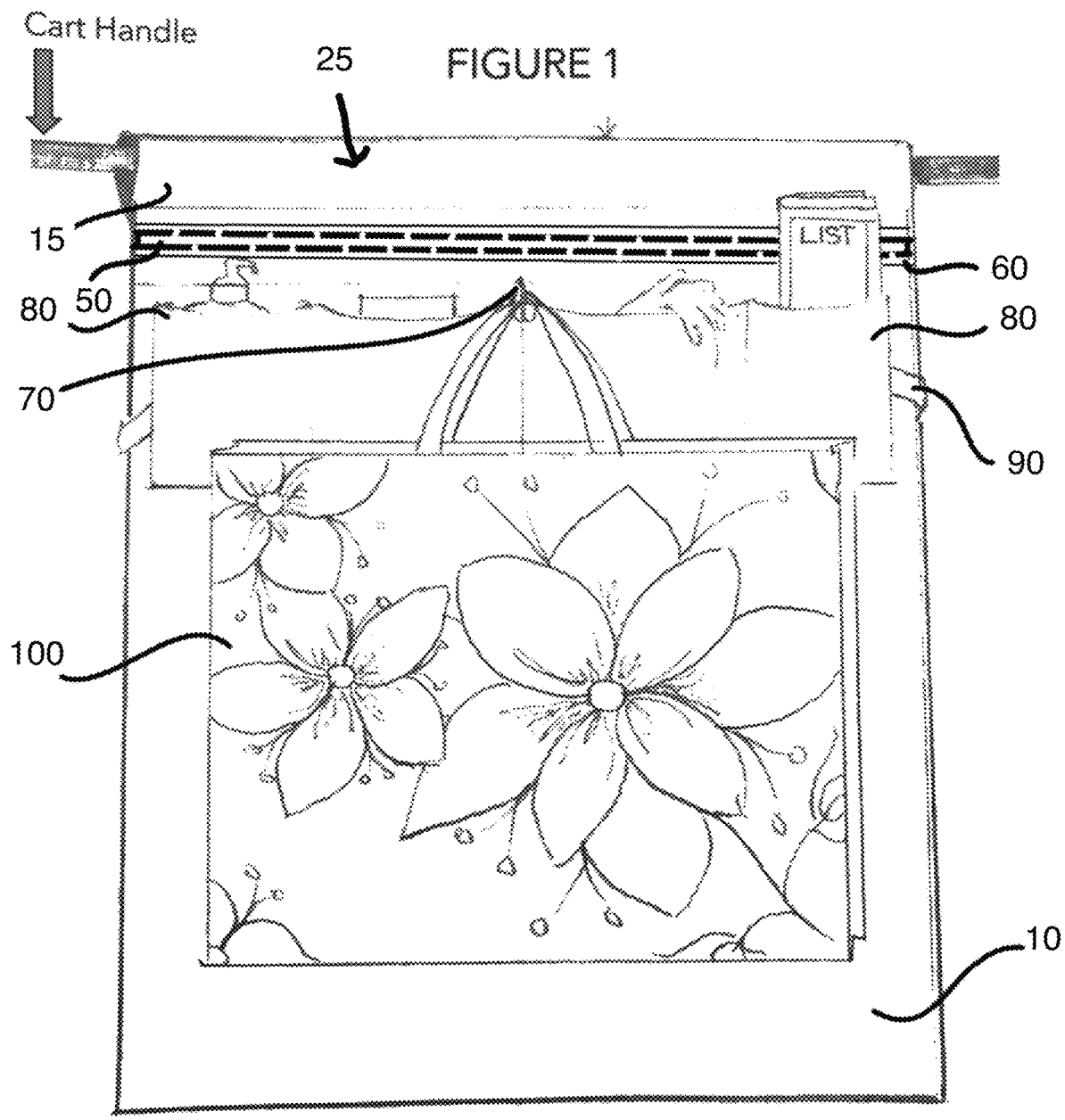
FIG. 1 shows a drawing of the frontal view of a completely opened Pocketed Reusable Bag Holder, hanging from a shopping cart handle.
Figure 2:
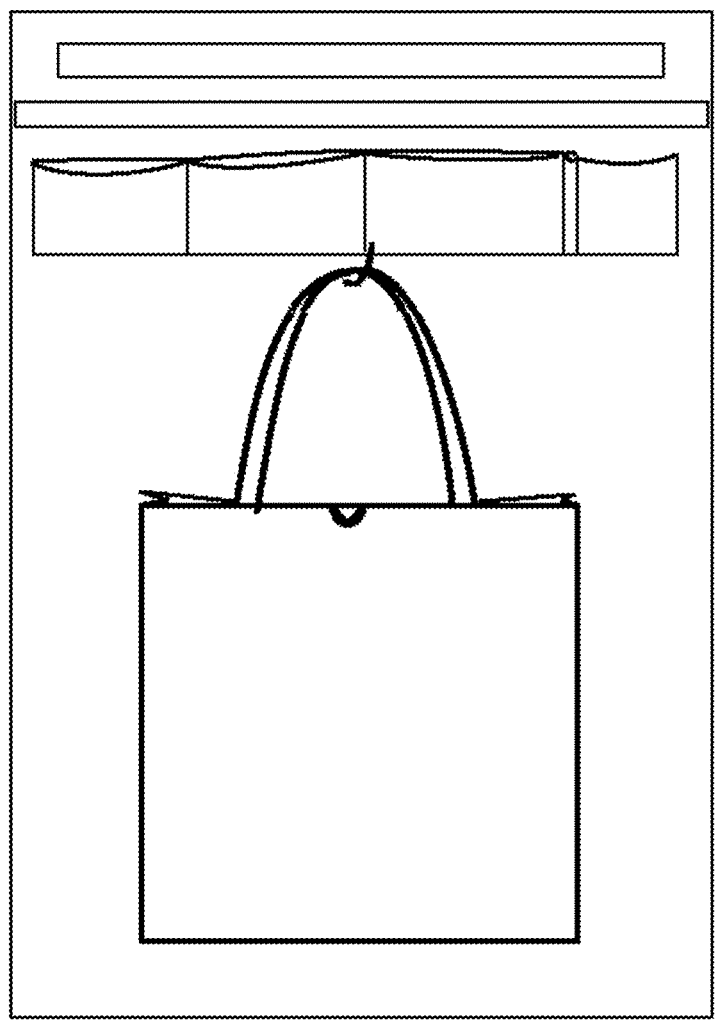
FIG. 2 shows a front view of the present invention, shown opened and hanging from a rack. The top of the apparatus is looped over the rack bar and secured with Velcro.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is a pocketed reusable bag holder and organizing apparatus configured to facilitate the transport, storage, and use reusable bags conventionally employed for grocery shopping. The primary component of the present invention is embodied in a primarily planar body (10) composed of a flexible material such as vinyl, fabric, plastic, or similar flexible polymers. The planar body (10) is configured to be used in two primary states: a rolled-up state and an unrolled state. Preferred embodiments of the present invention are equipped with a first hook-and-loop fastener strip (20), a second hook-and-loop fastener strip (30), a third hook-and-loop fastener strip (40), a stabilizing bar (50), a stabilizing bar pocket (60), a hook (70), pockets (80), and a strap (90).

With the body (10) oriented in the unrolled state, the first hook-and-loop fastener strip (20) is disposed on a top portion (15) of a front (25) of the body (10). The front (25) amounts to the interior of the apparatus when in the rolled-up state for storage and transit. The first hook-and-loop fastener strip (20) is configured to mate with the second hook-and-loop fastener strip (30) disposed on a rear (35) of the body (10), facilitating the creation of a loop. The loop is designed to be made around the handle of a shopping cart, stroller handle, or similar primarily horizontal handle. The first hook-and-loop fastener strip (20) is also configured to mate with the third hook-and-loop fastener strip (40) when the body (10) is rolled up, ensuring that the apparatus remains in the rolled-up state during transit and storage.

The stabilizing bar (50) is disposed within the stabilizing bar pocket (60), and is configured to provide rigidity to the body (10) when in an unrolled state during use. The stabilizing bar pocket (60) is preferably fashioned of a heavy plastic/vinyl material, and is located above the second hook-and-loop fastener strip (30) when attached to the handle of the shopping cart. The stabilizing bar (50), within the stabilizing bar pocket (60), is present in order to prevent undue torsion of the body (10) when it is hanging from a handle of a cart or other equipment. The stabilizing bar (50) may preferably be removed from the stabilizing bar pocket (60) by the user in order to facilitate washing of the body (10) in the event that it becomes dirty if desired. As such, the stabilizing bar pocket (60) preferably has at least one opening to facilitate removal of the stabilizing bar (50) as needed.

Figure 5:
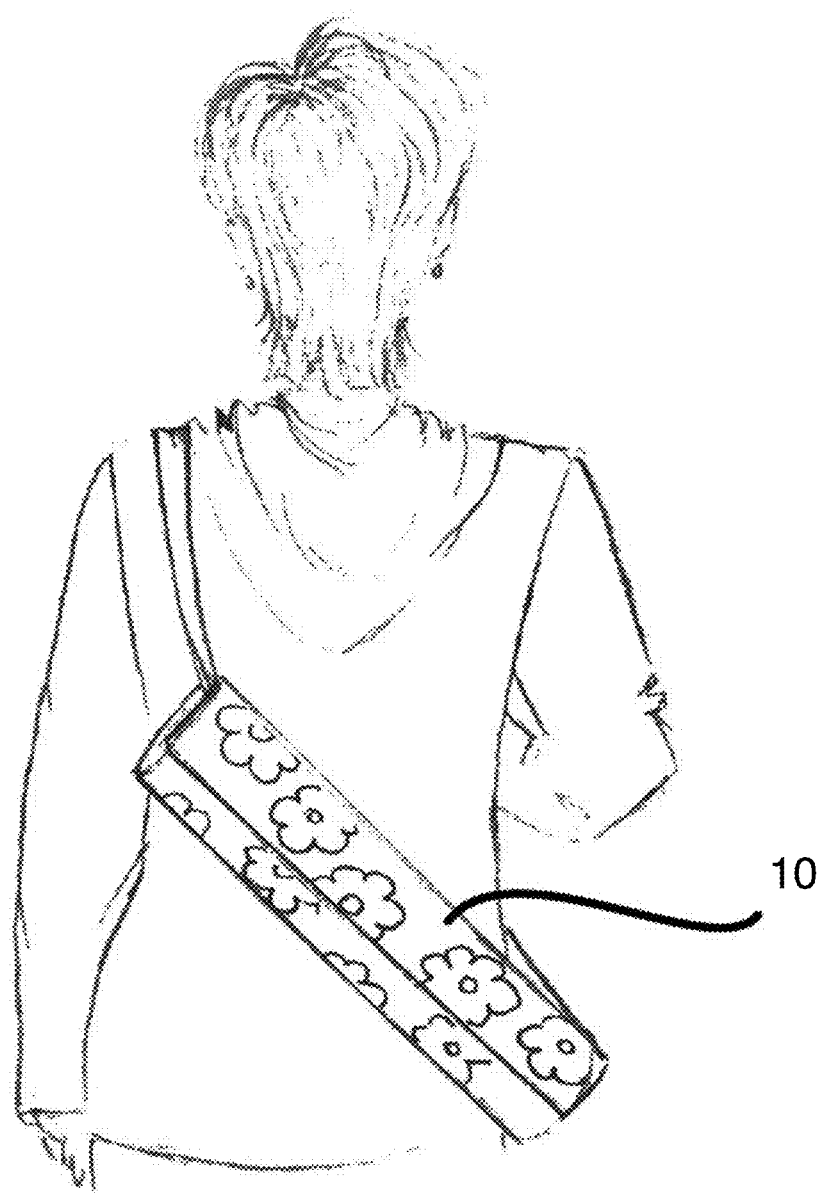
FIG. 5 shows a drawing of the present invention rolled up and in use, before being opened.
Figure 6:
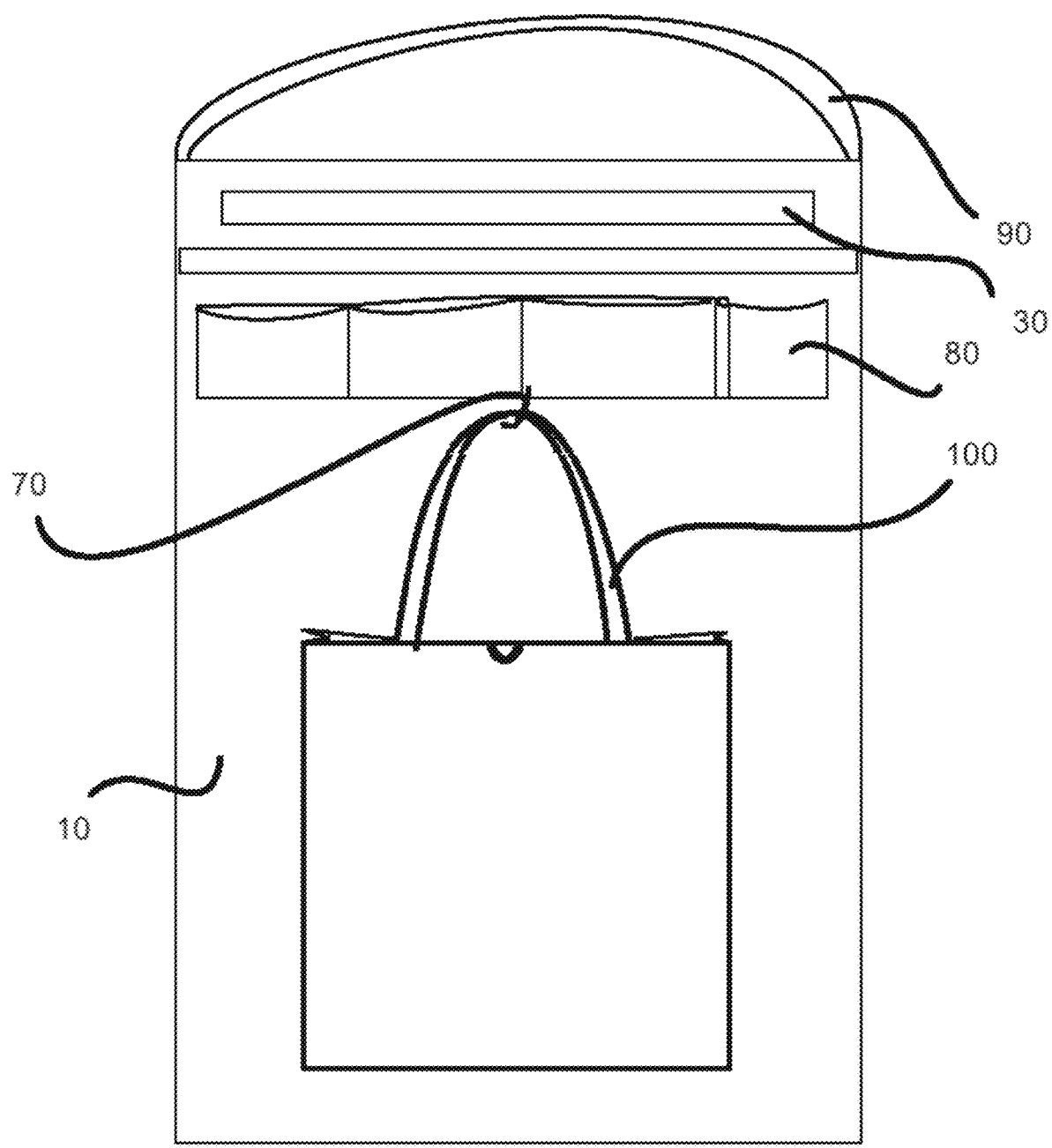
FIG. 6 shows a front view of the present invention in a completely opened state, laying on a table; Step 1 of readying the present invention for use, with bags in place.
Figure 7:
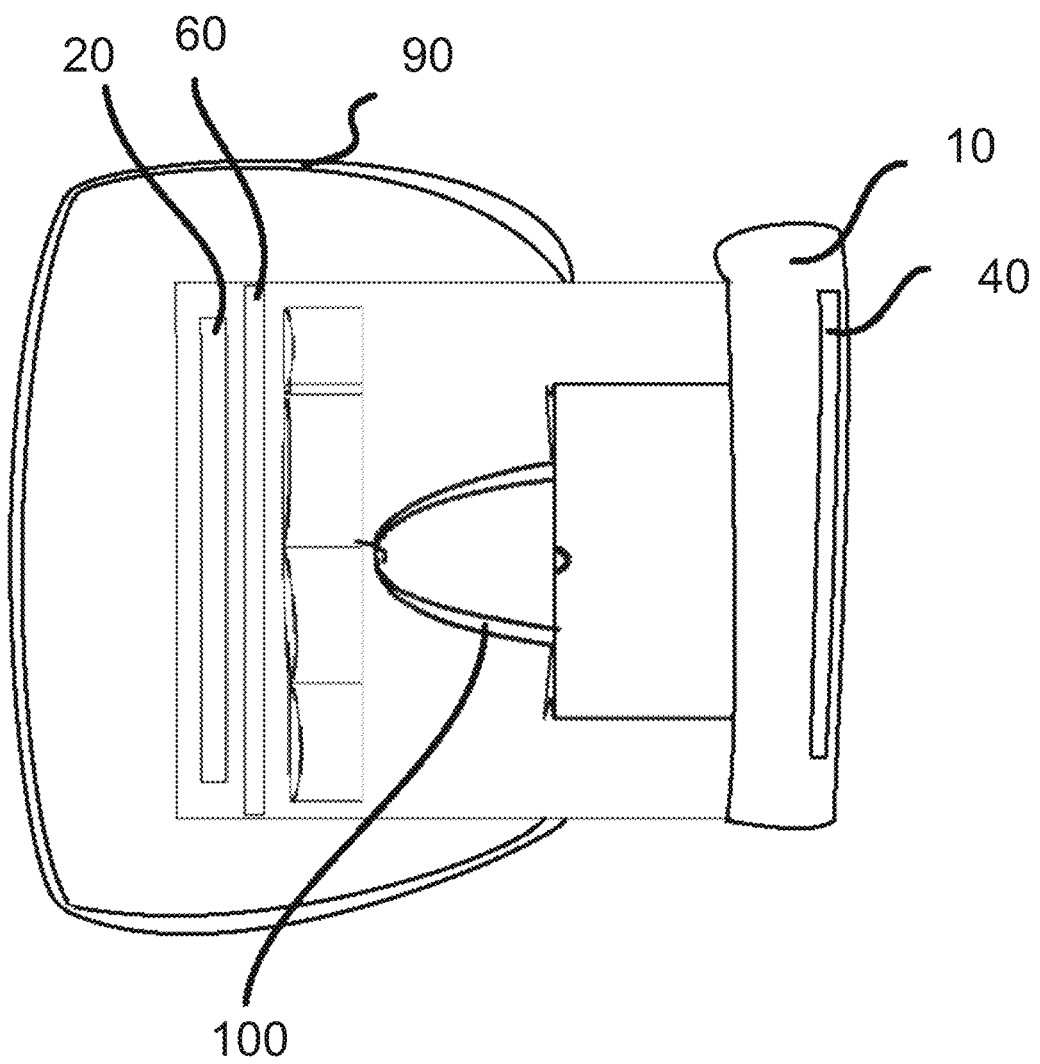
FIG. 7 shows a front view of a completely opened iteration of the present invention, laying on a table; Step 2, rolling up the recyclable bag holder.
Figure 8:
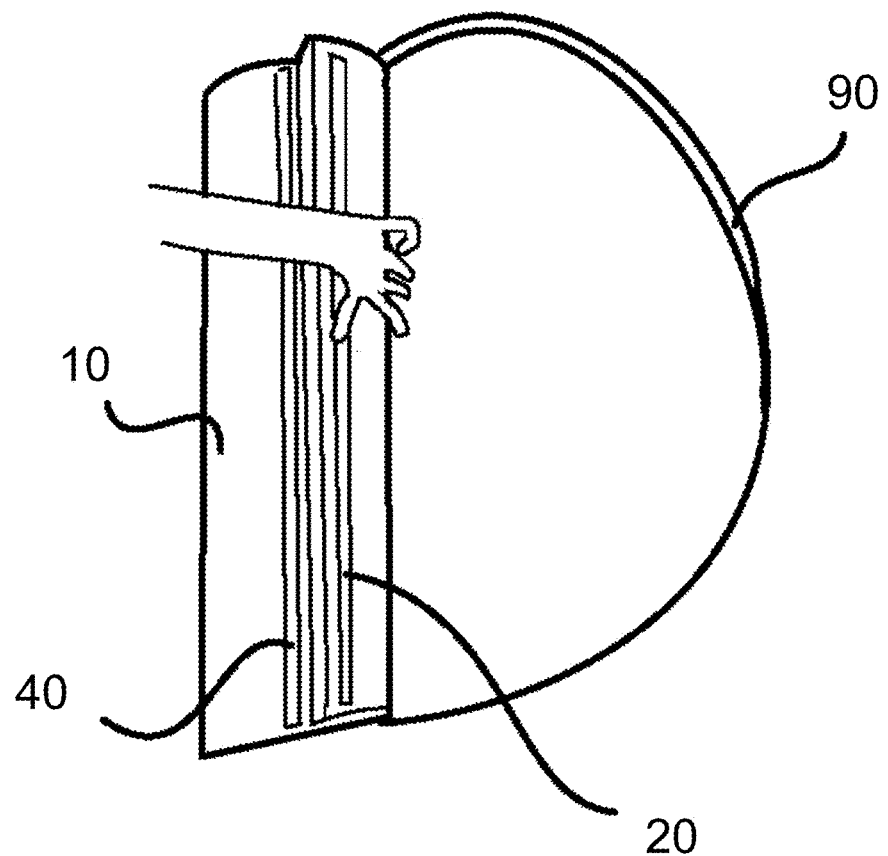
FIG. 8 shows a frontal view of a preferred embodiment of the present invention, laying on a table, Step 3, being rolled up and closed.
Figure 9:
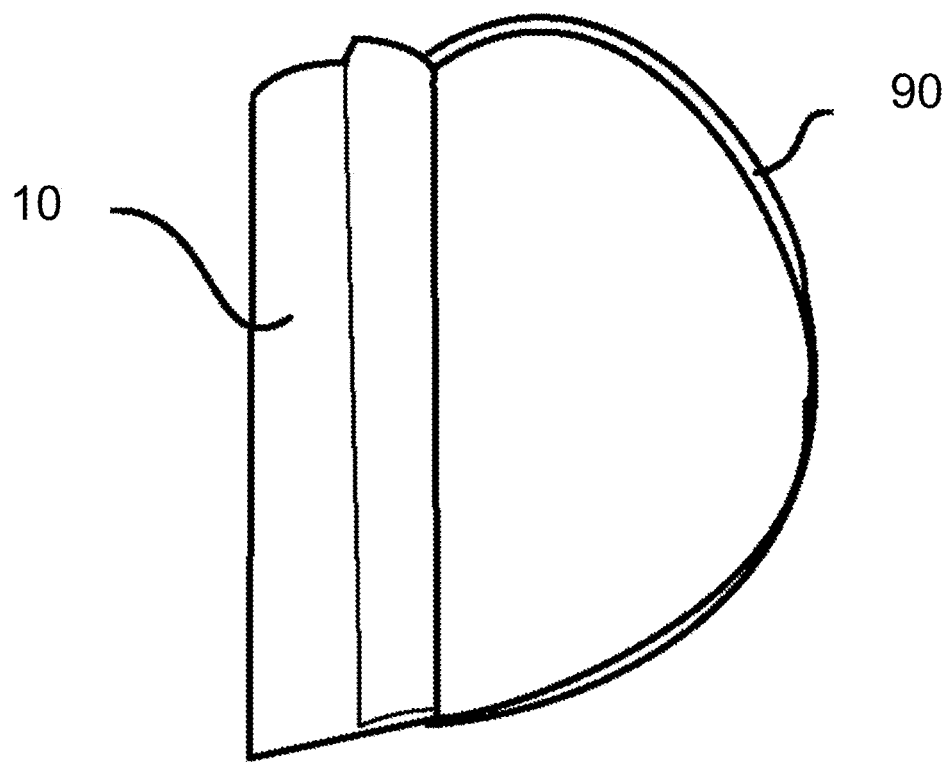
FIG. 9 shows a preferred embodiment of the present invention, laying on a table, Step 4, completely rolled up.
Figure 10:
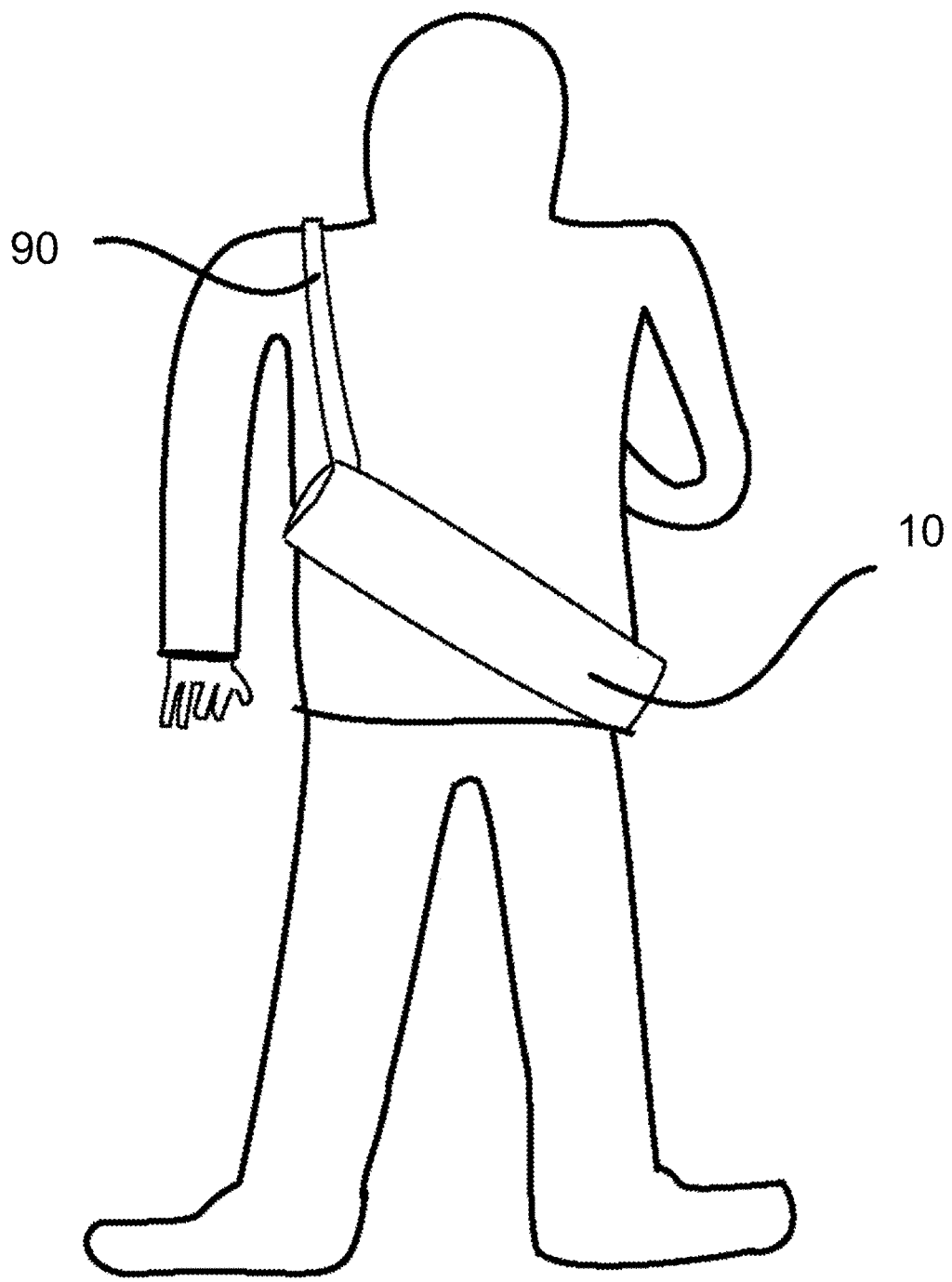
FIG. 10 shows a prototype in use, prior to being opened and placed on a cart.
Figure 11:
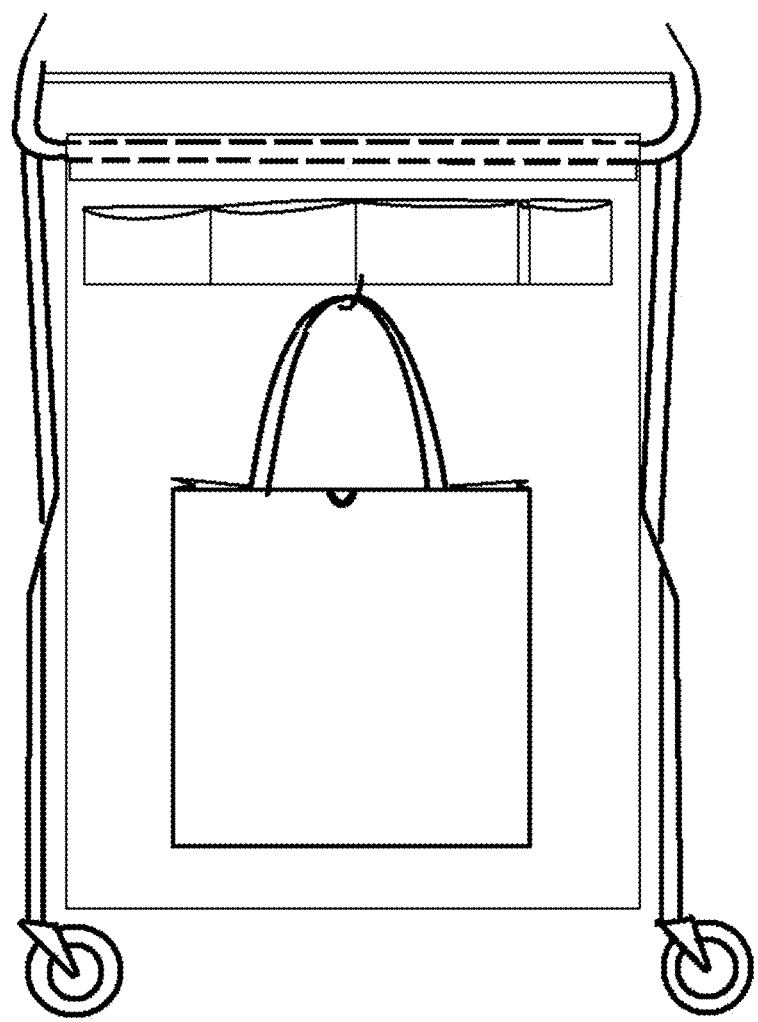
FIG. 11 shows a prototype hanging from the handle of the shopping cart. The top of the apparatus has been secured with a hook-and-loop fastener.
Figure 12:
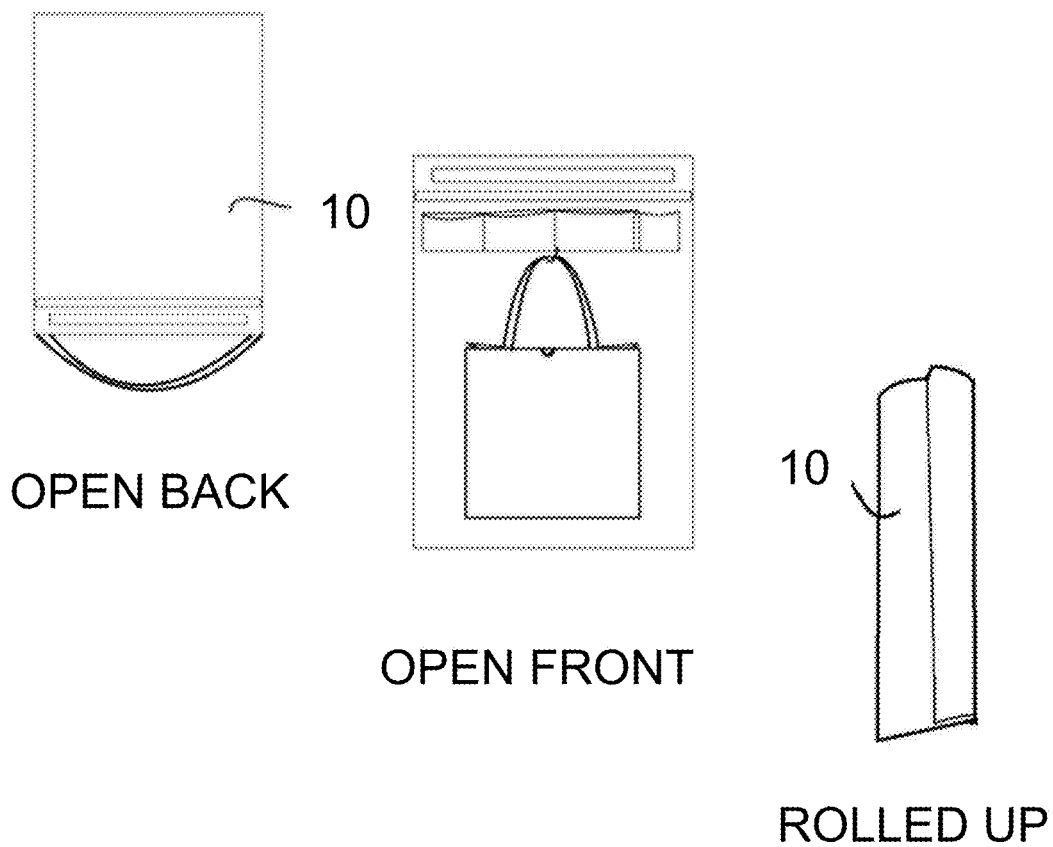
FIG. 12 shows another prototype with an open front, open back and rolled-up views.

The hook (70) is preferably positioned on an edge of the top portion, potentially in communication with the stabilizing bar (50) such that it hangs below the stabilizing bar (50) to allow for shopping bags (100) to hang from the hook (70) prior to use. The hook (70) is also to be used for organizing the shopping bags (100) when not in use, maintaining the shopping bags (100) in position for storage when the body (10) is in a rolled-up state. The hook (70) may be configured to pivot horizontally to more easily allow the body (10) to roll up for storage. The strap (90) of the present invention is preferably adjustable via a conventional adjustment mechanism. The strap (90) is preferably affixed, via fabric weld or similar conventional means, to a left side and a right side of the body (10) as shown in FIG. 5.

Figure 3:
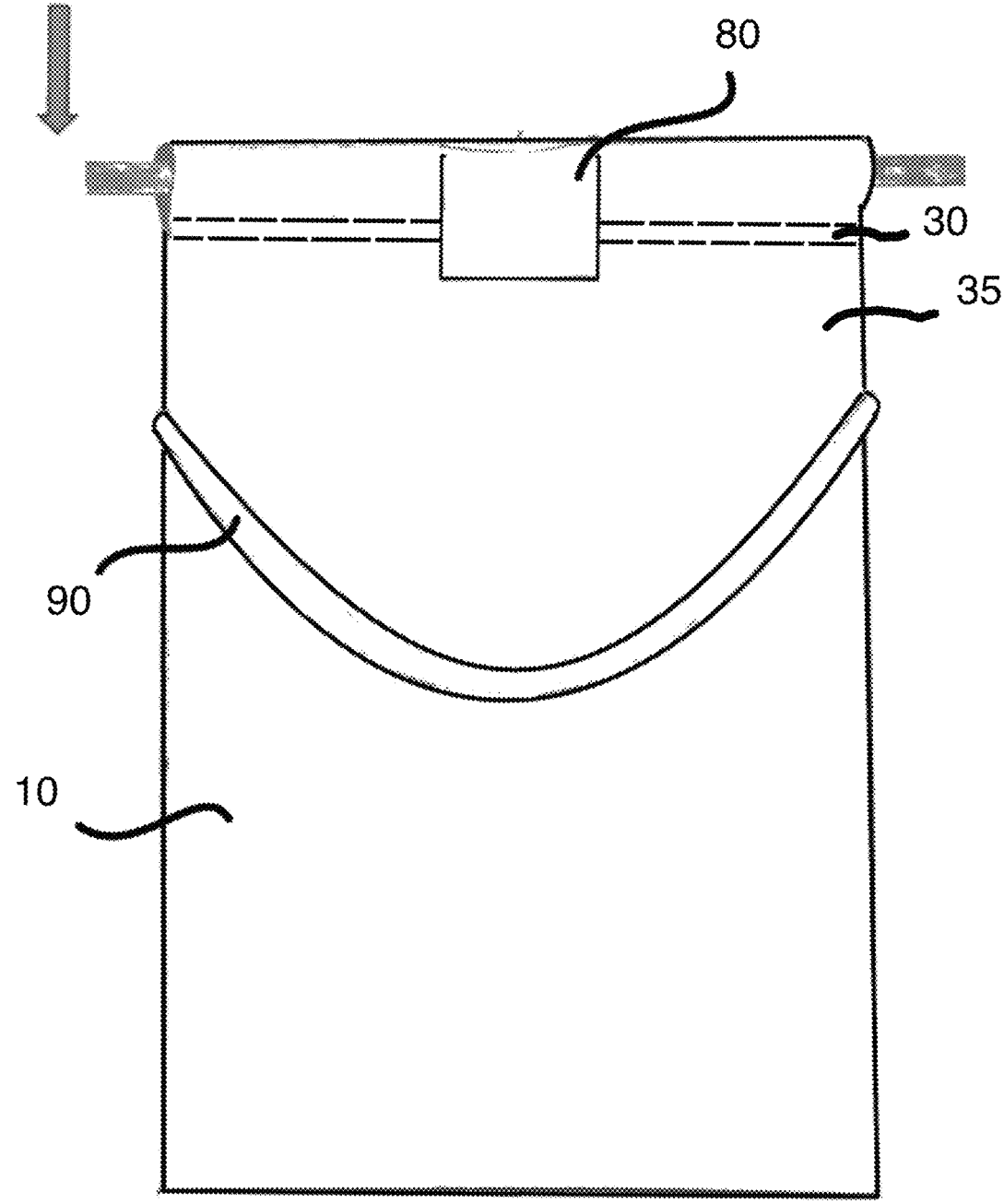
FIG. 3 shows a drawing of the back view of the present invention, shown in a completely opened state, hanging from a rack.
Figure 4:
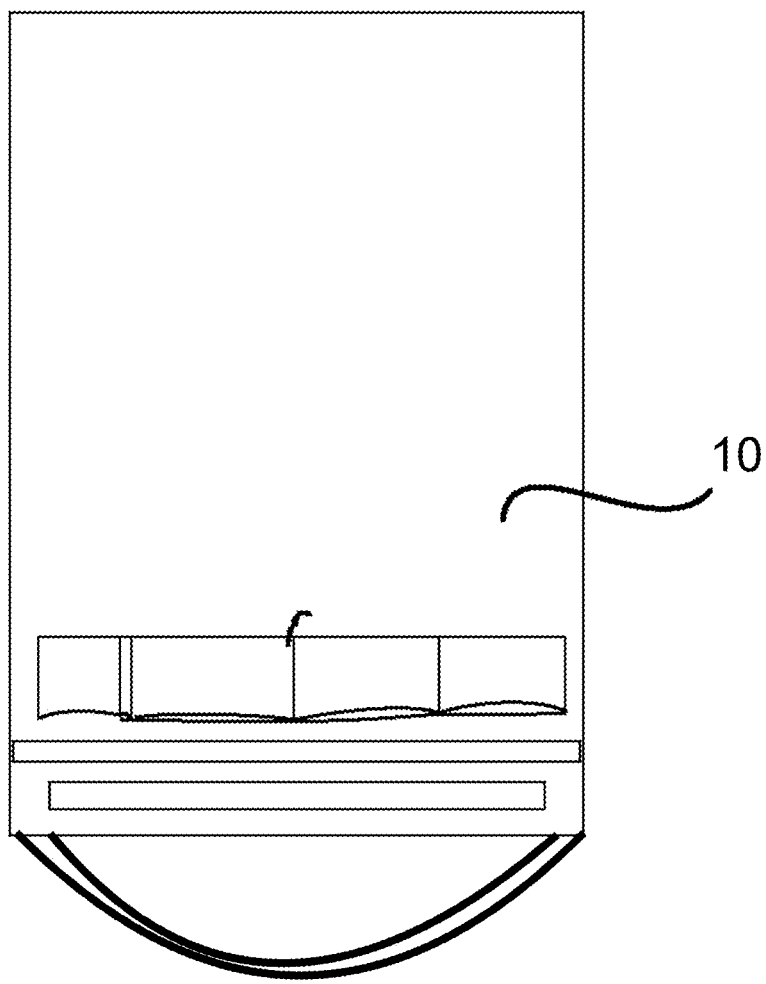
FIG. 4 shows a rear view of a completely opened iteration of the present invention, hanging from a rack. The top of the holder is looped over the bar and secured in place.

The present invention features several, easily accessible pockets (80) for shoppers to include shopping essentials, including but not limited to phones, gloves, wipes, sanitizer, coupons, grocery lists, and store scanners. Pockets (80) can be found on both the front (inside when rolled up), and rear (outside when rolled up) of the body (10) of the present invention, as noted in FIG. 1, showing the front pockets (80), and FIG. 3, showing the rear pocket (80). The orientation, spacing, width, and depth of the pockets are subject to change in various embodiments of the present invention. However, it should be understood that in all embodiments of the present invention, the pockets are configured to hold small personal items such as grocery lists, coupons, mobile devices, and similar items.

The body (10) and pockets (80) of the present invention are preferably constructed with various durable and flexible materials including but not limited to vinyl, canvas, plastic, leather, fabric, and other similar materials available in the industry. It should be noted that the present invention is lightweight, assembles and rolls up quickly and easily, and can be carried over the shoulder via the strap (90) with ease.

The parts of the body (10) of the present invention that must attach to one another can be attached using many materials, including but not limited to snaps, rivets, hooks, screws, hook-and-loop fasteners, latches, locks, hooks, zippers, latches, rivets, tabs and other findings and parts available in the industry. However, as previously noted, the preferred embodiment of the present invention employs a first hook-and-loop fastener strip (20), a second hook-and-loop fastener strip (30), a third hook-and-loop fastener strip (40) to ensure that the body (10) does not unroll during transit or storage, as well as to facilitate attachment of the apparatus to the handle of the shopping cart.

The present invention can be attached to many types of equipment or devices, including but not limited to carts, strollers, car seats, trolleys, wagons, carriages, walls, racks, trucks, carriages, pushcarts, shopping carts and more. The Pocketed Reusable Bag Holder can come in many shapes including by not limited to square, rectangular, triangular, round, oval shapes and more. Further, it should be understood that various embodiments of the present invention may be made available in a wide variety of colors, patterns, and aesthetic textures, as well as equipped with logos and/or lettering as desired.

The present invention is configured to be carried by, or attached to, equipment or other devices using many attachment mechanisms including, but not limited to, straps (90), hooks, clips, snaps, rings, straps, handles and other findings and parts available in the industry.

Figure 14:
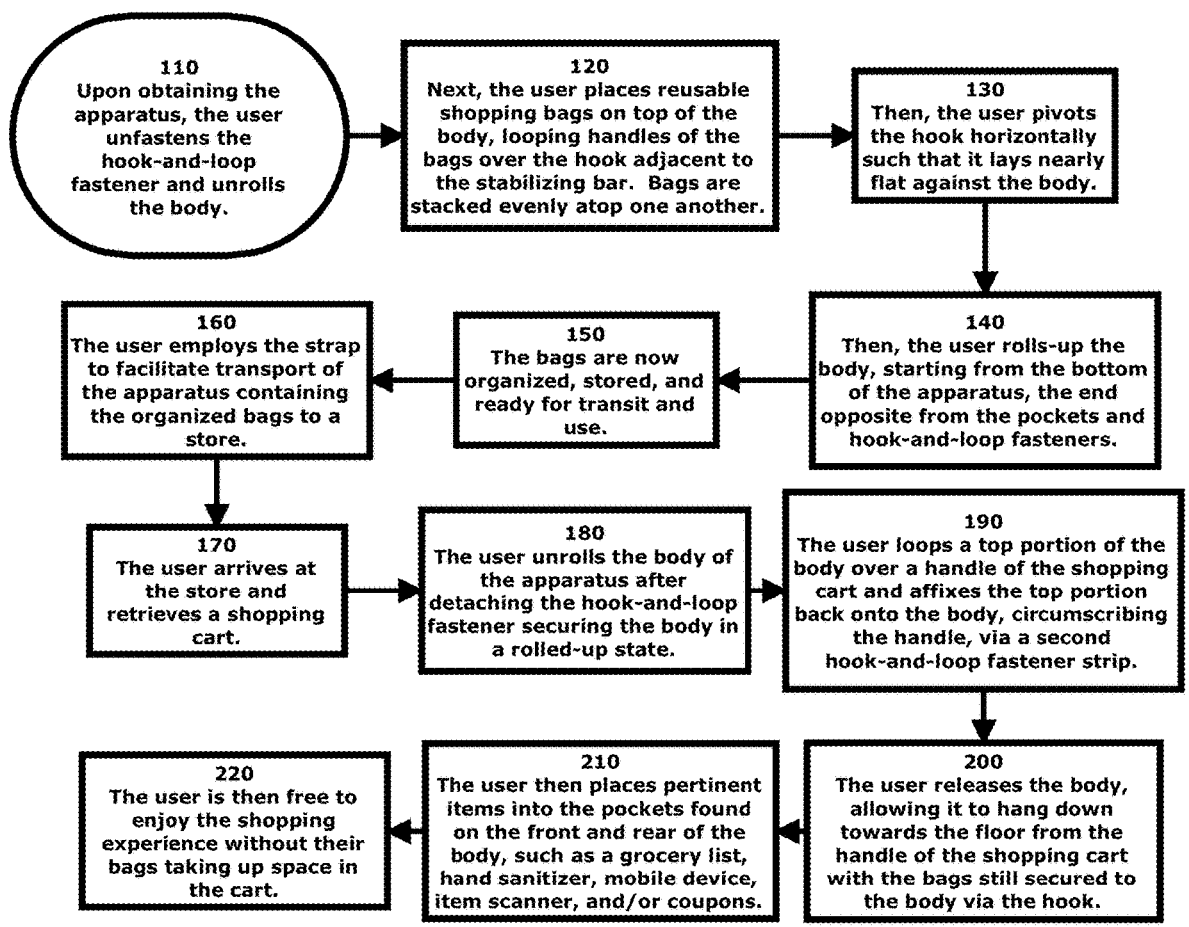
FIG. 14 depicts a flowchart detailing the process of use of the present invention by a user.

The process of use of the apparatus of the present invention, as shown in FIG. 14, is preferably as follows:
1. Upon obtaining the apparatus, the user unfastens the hook-and-loop fastener and unrolls the body. (110)
2. Next, the user places reusable shopping bags on top of the body, looping handles of the bags over the hook adjacent to the stabilizing bar. Bags are stacked evenly atop one another. (120)
3. Then, the user pivots the hook horizontally such that it lays nearly flat against the body. (130)
4. Then, the user rolls-up the body, starting from the bottom of the apparatus, the end opposite from the pockets and hook-and-loop fasteners. (140)
5. The bags are now organized, stored, and ready for transit and use. (150)
6. The user employs the strap to facilitate transport of the apparatus containing the organized bags to a store. (160) The strap allows the user to sling the apparatus over the shoulder, or may function as a handle.
7. The user arrives at the store and retrieves a shopping cart. (170)
8. The user unrolls the body of the apparatus after detaching the hook-and-loop fastener securing the body in a rolled-up state. (180)
9. The user loops a top portion of the body over a handle of the shopping cart and affixes the top portion back onto the body, circumscribing the handle, via a second hook-and-loop fastener strip. (190)
10. The user releases the body, allowing it to hang down towards the floor from the handle of the shopping cart with the bags still secured to the body via the hook. (200)
11. The user then places pertinent items into the pockets found on the front and rear of the body, such as a grocery list, hand sanitizer, mobile device, item scanner, and/or coupons. (210)
12. The user is then free to enjoy the shopping experience without their bags taking up space in the cart. (220)

It should be noted that, as the body (10) is mounted to the handle of the shopping cart via a loop of the top portion of the body (10), circumscribing the entirety of the circumference of the handle, the present invention functions as a form of cart protector, protecting the user from having to come into direct contact with the handle of the cart for extended periods of time, preventing the spread of germs.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:
1. A reusable bag holder for reusable bags having handles comprising:
   a body, said body composed of a flexible material having a front and a rear;
   wherein said body is generally planar, configured to be oriented in one of the two following positions: rolled-up state and unrolled state;
   pockets, said pockets disposed on said front and said back of said body;
   a strap, said strap disposed in fixed communication with edges of said body;
   a hook, said hook configured to connect to the handles of the reusable bags;
   a stabilizing bar, said stabilizing bar disposed within a stabilizing bar pocket;
   wherein said stabilizing bar is disposed above said hook, running horizontally through said body when body is disposed in said unrolled state;
   a first hook-and-loop fastener strip, said first hook and loop fastener strip disposed on said rear of said body;
   a second hook-and-loop fastener strip, said second hook and loop fastener strip disposed on said front of said body, configured to interlock with said first hook-and-loop fastener strip;
   a third hook-and-loop fastener strip, said third hook and loop fastener strip disposed on said front of said body, configured to interlock with said first hook-and-loop fastener strip; and
   wherein said first-hook-and-loop fastener interlocking with said third hook-and-loop fastener maintains said body in said rolled-up state, facilitating storage of the reusable bags in a stacked, organized disposition.

2. A reusable bag holder for reusable bags, the reusable bags having handles, comprising:
   a body, said body composed of a flexible material having a front and a rear;
   a bag fastening mechanism disposed on said body, said bag fastening mechanism configured to hold the handles of the reusable bags;
   a stabilizing bar disposed adjacent to said body, said stabilizing bar extending along at least part of the width of said body;
   further comprising a first attachment piece configured to hold said body in position; wherein said stabilizing bar is disposed above said bag fastening mechanism;
   wherein said first attachment piece is a configured to attach to a third attachment piece.

3. The reusable bag holder for reusable bags of claim 2, wherein said second attachment piece is configured to attach to said third attachment piece.

4. A reusable bag holder for reusable bags, the reusable bags having handles, comprising:
   a body, said body composed of a flexible material having a front and a rear;
   a bag fastening mechanism disposed on said body, said bag fastening mechanism configured to hold the handles of the reusable bags;
   a stabilizing bar disposed adjacent to said body, said stabilizing bar extending along at least part of the width of said body;
   wherein said stabilizing bar is disposed above said bag fastening mechanism;
   further comprising a first attachment piece configured to hold said body in position;
   further comprising a second attachment piece configured to hold said body in position; and wherein said first attachment piece is configured to attach to said second attachment piece.

5. A method of using a reusable bag holder for reusable bags, comprising:
   providing a reusable bag holder for reusable bags, the reusable bags having handles, comprising:
      a body, said body composed of a flexible material having a front and a rear;
      a bag fastening mechanism disposed on said body, said bag fastening mechanism configured to hold the handles of the reusable bags;
      a stabilizing bar disposed adjacent to said body, said stabilizing bar extending along at least part of the width of said body;
   unfastening the bag fastening mechanism to unroll the body;
   further comprising looping the body over a handle of a cart.

6. The method of using a reusable bag holder for reusable bags of claim 5, further comprising hanging the body down from the handle of the cart.

7. The method of using a reusable bag holder for reusable bags of claim 6, further comprising hanging the handles of the reusable bags from the bag fastening mechanism.

8. The method of using a reusable bag holder for reusable bags of claim 7, further comprising placing items into pockets on a front and a rear of the body.

\* \* \* \* \*